Dec. 9, 1947.  H. P. BOSWAU  2,432,276
FREQUENCY DETERMINING CIRCUIT FOR TELEPHONE RINGING CURRENT AND THE LIKE
Filed July 24, 1944
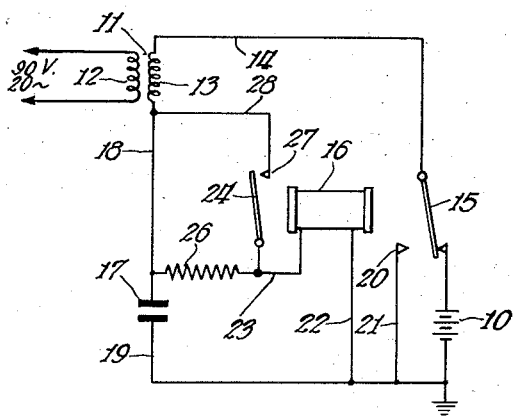
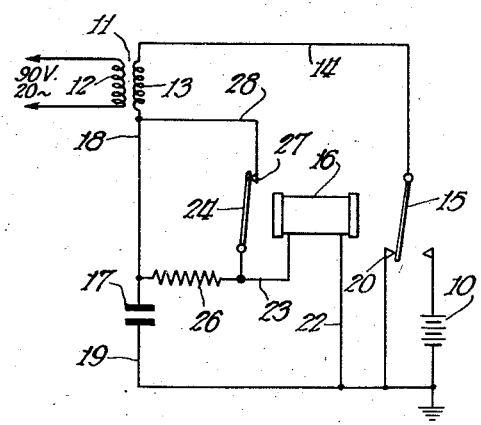
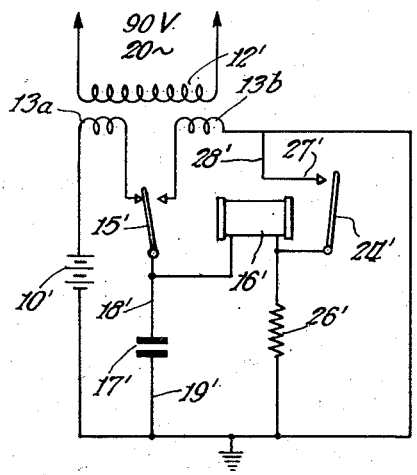
Inventor
Hans P. Boswau Patented Dec. 9, 1947

2,432,276

UNITED STATES PATENT OFFICE 2,432,276

FREQUENCY DETERMINING CIRCUIT FOR TELEPHONE RINGING CURRENT AND THE LIKE

Hans P. Boswau, Lorain, Ohio, assignor to Leich Electric Co., Genoa, Ill., a corporation of Illinois Application July 24, 1944, Serial No. 546,423

4 Claims. (Cl. 175—365)

1

The present invention relates to means for providing alternating current of predetermined frequency from a direct current source of supply. The invention is particularly applicable in pole changers for supplying ringing current for telephones.

It is the purpose of my invention to provide means of this character wherein the frequency is broadly determined by electrical constants of the circuit without mechanical tuning. According to the invention the circuit includes provisions whereby sparking at the contacts is substantially eliminated for a wide range of frequency.

In the art of providing ringing current for telephones, devices of this nature are commonly referred to as pole changers. My invention contemplates the provision of a pole changer wherein the frequency is determined by electrical constants and not by mechanical tuning. The pole changer is of such nature as to be suitable for using ordinary telephone relays. A novel circuit arrangement substantially eliminates destructive arcing at the contacts by insuring low current flow at the instant the contacts open.

The features and advantages of the present invention will appear more fully as the description proceeds, reference being had to the accompanying drawings wherein a preferred form of the invention is shown. It is to be understood however that the drawings and description are illustrative only and are not to be taken as limiting the invention except insofar as it is limited by the claims.

In the drawings:

Fig. 1 is a diagrammatic representation of a pole changer embodying my invention, showing the initial contact positions;

Fig. 2 is a view like Fig. 1 with the contacts attracted by the relay; and

Fig. 3 is a diagrammatic representation of a modified circuit for the pole changer.

Referring now in detail to the drawings, the invention is shown as embodied in a pole changer for supplying ringing current from a source 10 of direct current (for example a storage battery). The ringing current is supplied by the secondary 12 of a transformer 11. The primary 13 of the transformer is connected to one terminal of the battery 10 by a lead 14 through an armature 15 of a relay 16. The relay 16 has a relatively high resistance (about 5000 ohms).

A condenser 17 has one terminal connected to the primary coil 13 of the transformer 11 by a lead 18. The opposite terminal of the condenser 17 is connected to the grounded side of the battery 10 by a lead 19. Thus when the armature 15 is in the position shown in Fig. 1 the battery 10 will supply current through the primary coil 13 to charge the condenser 17. When the armature 15 is attracted by the relay 16 it makes contact with a contact 20 connected to ground by a lead 21 to allow the condenser to discharge through the primary coil 13. Thus current impulses can be passed through the primary coil 13 by the charging and discharging of the condenser 17 under control of the relay 16.

The actuation of the relay is accomplished in such fashion as to avoid breaking any contacts while a substantial amount of current is flowing. One terminal of the relay coil is connected to the grounded lead 19 by a lead 22. The other terminal of the relay coil is connected by a lead 23 to a control armature 24. The relay coil is connected in series with a relatively high resistance 26 (of about 5000 ohms) which is connected from the lead 23 to the lead 18. When the armature 24 is attracted it engages a contact 27 which is connected by a lead 28 to the lead 18 so as to by-pass the resistance 26.

The specific characteristics of the electrical units employed may be selected to give the desired frequency of output current. For example, if I want a 90 volt, 20 cycle ringing current from a 48 volt battery I may employ a transformer having a primary coil resistance of about 5 ohms and a secondary coil resistance of about 100 ohms. The condenser capacity is about 750 mf. The relay coil has a resistance of about 5000 ohms and the resistance 26 is about 5000 ohms.

The pole changer operates as follows: When the armature 15 is in the position shown in Fig. 1 current flows from the battery 10 through the primary coil 13 to charge the condenser 17 and gradually increase the voltage across the condenser 17 and the relay 16. When the condenser is charged nearly to full voltage the relay 16 operates. At this time the charging current has decreased to a very small value so that separation of the armature 15 from its back contact does not cause any sparking. When the armature 15 engages its front contact 20 the condenser discharges through the primary 13, lead 14, armature 15, contact 20 and lead 21. This discharge is in the opposite direction to the charging current flow so the transformer delivers alternating current from its secondary winding.

When the relay 16 operates it also attracts its armature 24 and cuts the resistance 26 out of circuit. The resistance of the relay plus the resistance 26 limits the relay current so that there is no sparking trouble at the contact 27. With the resistance 26 short-circuited the relay 16 will hold at a very low voltage as compared to that necessary to operate it with the resistance 26 in series with it. Therefore, the discharge current through the primary coil 13 reaches such a low value by the time the relay releases its armatures that substantially no sparking occurs at the contacts 20 and 27. The periodic charging and discharging of the condenser through the primary coil 13 provides the necessary ringing current in the secondary coil 12 at the desired frequency.

I am aware of course that it is old to utilize the charging and discharging of a condenser to obtain primary current for a transformer from a constant voltage direct current source. Such devices however do not, to my knowledge, utilize the novel means to prevent destructive arcing so that mechanical tuning is not necessary. Various frequencies are obtainable as desired merely by changing the electrical constants to vary the period of charge and discharge of the condenser 17. The particular combination of the relay with the resistance unit 26, the transformer 11 and the condenser makes it possible to accomplish all circuit openings at relatively low current flow.

In Fig. 3 of the drawings I have shown a slightly different circuit wherein the armature 15' and contacts of the relay 16' are so arranged as to eliminate direct battery and ground connection. In this form of the circuit two primary windings 13a and 13b are required. The operation is essentially the same as in the form of the invention shown in Figs. 1 and 2.

From the foregoing description it is believed that the nature and advantages of my invention will be apparent to those skilled in this art.

Having thus described my invention, what I claim as new and desire to secure by Letters Patent is:

1. In a system for converting direct to alternating current by alternately charging and discharging a condenser through the primary of a transformer, a condenser, a source of direct current, a relay, an energizing circuit therefor connecting said relay with said source, said circuit including a high resistance in series with said relay and a shunt connection around said resistance, a pair of armatures for said relay, one of said armatures being included in said shunt connection and having contact means cooperating therewith to complete said shunt connection upon being attracted by said relay, the other of said armatures having a first contact means connected in said energizing circuit to connect said condenser and relay to the source only when said other armature is released and a second contact means with connections providing a discharge path for the condenser only when said other armature is attracted said shunt circuit, resistance and relay being in bridging relation to said condenser, whereby said relay is energized to move said shunt armature to complete the shunt connection when charging of the condenser is substantially complete and remain in such position until discharge of the condenser is substantially complete.

2. In a system for converting direct to alternating current, a condenser, a direct current source, a transformer, and means for alternately establishing two circuits including a primary winding of said transformer and said condenser, one of said circuits including said direct current source to charge said condenser and the other circuit including a connection by-passing said direct current source to discharge said condenser, said means comprising a relay having a winding and a pair of movable contact members mounted to be both held in one position when said relay winding is energized and both held in an alternative position when said relay winding is de-energized, a pair of stationary contacts each included in one of said circuits, one of said movable contact members being included in both said circuits and engaging one of said stationary contacts in one position thereof and the other stationary contact in the other position thereof, means for energizing said relay winding from said direct current source after said condenser is substantially fully charged to move said movable contact member to engage the stationary contact member that establishes the discharging circuit comprising a high resistance and means connecting said high resistance in series with said relay winding across the terminals of said condenser, a stationary contact, the other of said movable contact members engaging said last mentioned stationary contact upon energization of said relay winding, and circuit connections establishing a shunt connection around said resistance upon movement of said other movable contact member into stationary contact engaging position to maintain energization of said relay winding through a much lower resistance circuit during discharge of said condenser.

3. In a system for converting direct current into alternating current of a desired frequency, a transformer having a secondary winding for connection to a load circuit, said transformer having two primary windings, a direct current source connected with one end of one of said primary windings, a condenser, and relay means operable alternately to charge the condenser through one primary winding and discharge the condenser through the other primary winding, comprising a stationary contact connected with the other end of said one primary winding, a relay winding, a movable contact member held in engagement with said stationary contact when said relay means is de-energized, means connecting one terminal of said condenser with said movable contact member, means connecting the other terminal of said condenser with said direct current source and with one end of said other primary winding, a second stationary contact connected with the other end of said other primary winding and with which said movable contact member is held in engagement during energization of said relay means, means for energizing said relay winding from said direct current source after said condenser is fully charged comprising a high resistance and means connecting said high resistance in series with said relay winding across the terminals of said condenser, a stationary contact, another movable contact member held in engagement with said last mentioned stationary contact upon energization of said relay means and out of contact therewith upon de-energization of said relay means, and circuit connections establishing a shunt connection around said resistance upon movement of said last mentioned movable contact member into stationary contact engaging position to maintain energization of said relay means through a much lower resistance circuit during discharge of said condenser.

4. In a system for converting direct current into alternating current of a desired frequency, a transformer having a secondary winding for connection to a load circuit and a primary winding, a direct current source, a condenser, means connecting one terminal of said condenser with one end of said primary winding, means connecting the other terminal of said condenser with one terminal of said direct current source, and relay means operable alternately to charge the condenser and discharge the condenser through said primary winding, comprising a stationary contact connected with the opposite side of said direct current source, a second stationary contact and means connecting said second contact with said last mentioned terminal of said condenser, a relay winding, a movable contact member connected with the other end of said primary winding and held in engagement with said second stationary contact when said relay means is energized to afford a condenser discharge path bypassing the direct current source, and held in engagement with said first mentioned stationary contact when said relay means is de-energized, means for energizing said relay winding from said direct current source after said condenser is fully charged, comprising a high resistance and means connecting said high resistance in series with said relay winding across the terminals of said condenser, a stationary contact, another movable contact member held in engagement with said last mentioned stationary contact upon energization of said relay means and out of contact therewith upon de-energization of said relay means, and circuit connections establishing a shunt connection around said resistance upon movement of said last mentioned movable contact member into stationary contact engaging position to maintain energization of said relay means through a much lower resistance circuit during discharge of said condenser.

HANS P. BOSWAU.

REFERENCES CITED

The following references are of record in the file of this patent:

UNITED STATES PATENTS

| Number | Name | Date |
| --- | --- | --- |
| 2,035,875 | Garstang | Mar. 31, 1936 |
| 2,210,211 | Levenberg | Aug. 6, 1940 |
| 2,352,299 | Walker | June 27, 1944 |
| 1,292,815 | Leich | Jan. 28, 1919 |
| 1,296,269 | Crawford et al. | Mar. 4, 1919 |
| 1,307,517 | Rainey | June 24, 1919 |
| 2,258,303 | Schmidt et al. | Oct. 7, 1941 |
| 2,298,003 | Feingold | Oct. 6, 1942 |
| 2,313,527 | Edwards | Mar. 9, 1943 |
| 2,129,747 | Sorensen | Sept. 13, 1938 |
| 2,265,717 | Bedford | Dec. 9, 1941 |